United States Patent [19]

Schatz

[11] Patent Number: 4,704,868

[45] Date of Patent: Nov. 10, 1987

[54] APPARATUS FOR THE EXPANSION OF PRESSURIZED, PULSATING EXHAUST GASES, MORE ESPECIALLY THE EXHAUST GASES OF AN INTERNAL COMBUSTION ENGINE

[75] Inventor: Oskar Schatz, Gauting, Fed. Rep. of Germany

[73] Assignee: Helmut Lamprecht, Fed. Rep. of Germany

[21] Appl. No.: 712,711

[22] PCT Filed: Jul. 2, 1984

[86] PCT No.: PCT/DE84/00138
§ 371 Date: Mar. 5, 1985
§ 102(e) Date: Mar. 5, 1985

[87] PCT Pub. No.: WO85/00404
PCT Pub. Date: Jan. 31, 1985

[30] Foreign Application Priority Data

Jul. 2, 1983 [DE] Fed. Rep. of Germany ....... 3323959

[51] Int. Cl.⁴ .............................................. F02B 37/00
[52] U.S. Cl. .......................................... 60/620; 60/624
[58] Field of Search .................................. 60/620, 624

[56] References Cited

U.S. PATENT DOCUMENTS 2,625,006  1/1953  Lundquist .............................. 60/624
3,924,576  12/1975  Siewert ................................. 60/620

FOREIGN PATENT DOCUMENTS 2295234  7/1976  France .

Primary Examiner—Douglas Hart
Attorney, Agent, or Firm—Harness, Dickey & Pierce

[57] ABSTRACT

An apparatus for the expansion of pressurized, pulsating exhaust gases comprises at least one expansion chamber (12a, 12b; 40; 68, and 70), a piston (18; 44; and 66) oscillating in the expansion chamber (12a, 12b; 40; 68 and 70) and an output drive (16, 34; 46, 56, 63; 67, 90, 92 and 110) that is connected with the piston (18; 44; and 66) and includes a directional clutch (36; 58; 102, and 104), that is so arranged that it produces a coupling connection in the direction of motion corresponding to exhaust gas expansion. In the case of there being at least two expansion chambers (68 and 70) adapted to receive exhaust gas acting in opposite directions there is preferably a directional clutch (102 and 104) for each direction of expansion, said two directional clutches (102 and 104) being connected together by means of a reversing drive (86, 88, 90, 92 and 110) for output drive in the same direction. The piston (18; 44; and 66) is associated with a returning means (48) acting against the direction of expansion of the exhaust gases.

3 Claims, 3 Drawing Figures

APPARATUS FOR THE EXPANSION OF PRESSURIZED, PULSATING EXHAUST GASES, MORE ESPECIALLY THE EXHAUST GASES OF AN INTERNAL COMBUSTION ENGINE

The invention relates to an apparatus for the expansion of pressurized, pulsating exhaust gases, more especially from an internal combustion engine with at least one expansion chamber and an oscillating piston located in said expansion chamber as well as an output drive connected with the piston.

In many technical processes exhaust gases are produced in a pressurized condition, which are however allowed to escape without being utilized, because providing the amount of apparatus for the recovery of such usually low-grade energy would be uneconomic. One example of the exploitation of the energy of exhaust gases is to be seen in exhaust-driven chargers for pumping the charging or combustion air of an internal combustion engine.

In the case of internal combustion engines the pressurized exhaust gases are in a pulsating form. Pressure waves may be produced in exhaust gases under a steady pressure by a chopper.

Oscillating pistons, that either reciprocate linearly or rotate backwards and forwards may be used for making use of pressurized exhaust gases, but however such pistons make a complex automatic control system necessary to ensure that the energy of the exhaust gases only has a driving effect as opposed to a retarding one.

The object of the invention is to devise an apparatus of the sort initially specified such that the price advantages of oscillating pistons may be profited from, without elaborate automatic control means being needed.

In order to effect this object the output drive comprises a directional clutch that is so aligned that it produces a coupling connection in the direction of motion corresponding with expansion of the exhaust gas, and in that there is a returning means acting contrary to the direction of expansion of the exhaust gases.

This design ensures, without the employment of any special automatic control system, that the output drive is in all cases only acted upon by the expansion energy in the desired output drive direction. Since it is not possible for the return motion of the piston to be caused directly by the driven load owing to the presence of the directional clutch, the apparatus is provided with a returning means. This returning means may for example be in the form of a return spring or it may be a question of a system involving alternate action of the exhaust gas in opposite directions.

In the case of an apparatus with at least two expansion chambers acted upon oppositely by the exhaust gas, a useful development of the invention is possible such that each expansion means has a directional clutch and the two directional clutches are connected by means of a reversing means for output drive in the same direction.

An detailed account will now be given of working examples of the invention using the drawing.

Figure 1:
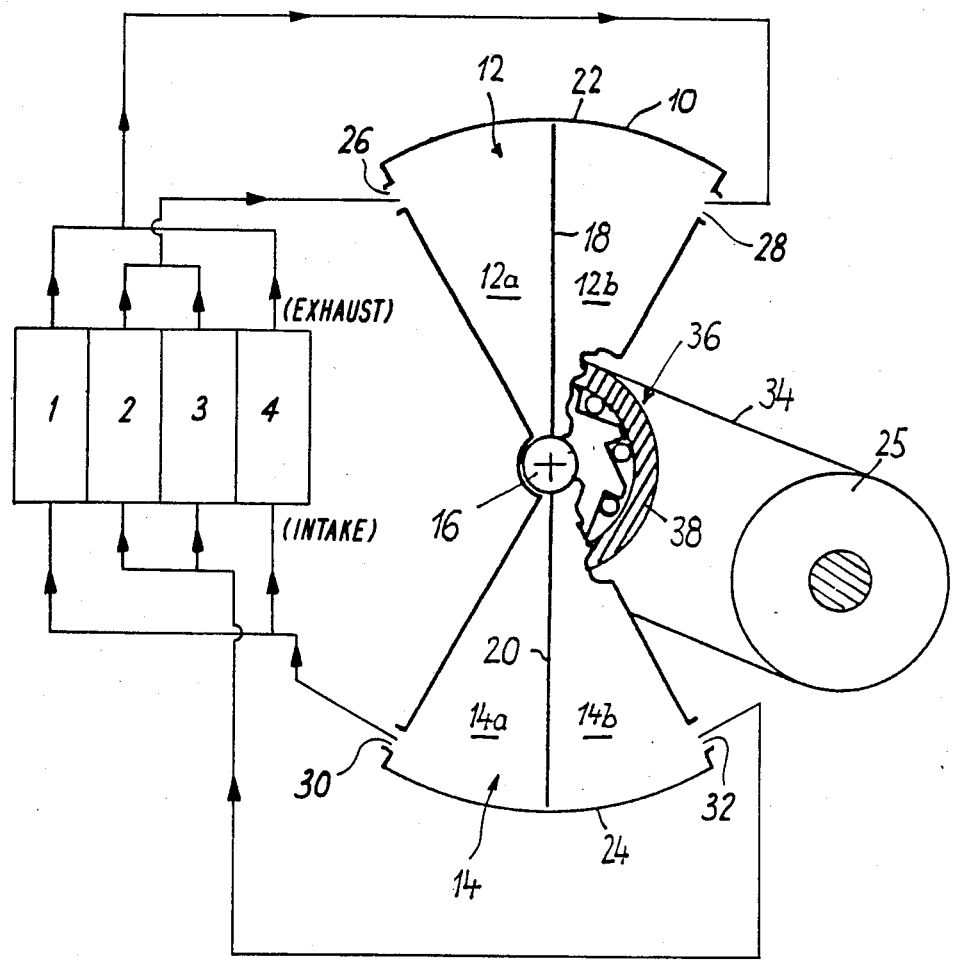
FIG. 1 is a diagrammatic cross section through an apparatus of the invention designed as an expansion charger for internal combustion engines, in a form with oscillating vanes.

The apparatus viewed in FIG. 1 has a housing 10, that has two chambers 12 and 14 in it, that are sector-like in cross section, which have their points turned towards each other and at their sector points are open towards a central shaft 16 bearinged in the housing 10 so that vanes 18 and 20, that are joined to the shaft 16 and function as oscillating pistons, may radially sweep the chambers 12 and 14, respectively, as far as their outer wall faces 22 and 24, respectively, that are concentric to the shaft 16. These vanes 18 and 20 divide the chambers 12 and 14, respectively, into two chamber parts 12a and 12b in the one case and 14a and 14b in the other case. The chamber parts 12a and 12b on the one hand and 14a and 14b on the other hand may be separated from each other by a very narrow gap or by suitable packings on the radially outer ends of the vanes 18 and 20 respectively.

Each of the chamber parts 12a, 12b, 14a and 14b is provided with at least one fluid connection 26, 28, 30 and 32, same being so located that the connection with the respective associated chamber part is maintained in existence during the full swinging stroke of the vanes 18 and 20.

In each case two chambers, that is to say in the example illustrated, the chambers 12 and 14, are placed in pairs together, the one chamber, as for example the chamber 12, receiving the hot exhaust gases from the combustion chamber of the engine, while the other chamber, that is to say for example the chamber 14, receives the charging air to be supplied to the combustion chamber. Since alternately one of the chamber parts 12a or 12b at a time increases in volume and at the same time the chamber parts 14a or 14b decrease in volume, the one or other the chamber parts 12a or 12b, namely the chamber that is increasing in volume, will be joined alternately with the combustion space, whereas on the other hand the other chamber part is joined with the exhaust gas system, and that part chamber of the two part chambers 14a and 14b that is in the process of increasing in volume is joined with the combustion chamber. The respective chamber part 12a or 12b increasing in volume functions as an expansion chamber so that therefore the vane 18 is acted upon alternately in the one or the other direction by the exhaust gas that is to expand. This double acting arrangement at the same time functions as a returning means, because in relation to the expansion stroke of the vane 18 in the one direction the expansion stroke in the other direction constitutes a return motion of the vane 18.

In the case of the working example to be seen in FIG. 1 there is a mechanical connection between the shaft 16 and the diagrammatically shown output side 25 of the engine to be charged, in the form of a belt drive 34. In this respect the mechanical output drive is fitted with a directional clutch in the form of a freewheel generally referenced 36, whose outer ring 38 may furthermore be connected for example by way of a gear drive with the output side 25 of the engine in place of the belt drive 34.

For this reason the motion of the vanes 18 and 20 may be transmitted in constantly the same direction to the output side of the engine. If the angular velocity of the charger in the selected direction of rotation is greater than the angular velocity of the part, joined with the engine output side 25 of the output drive, the apparatus functions as an expander and the force recovered from the expansion of the exhaust gas is transmitted to the motor output drive.

Figure 3:
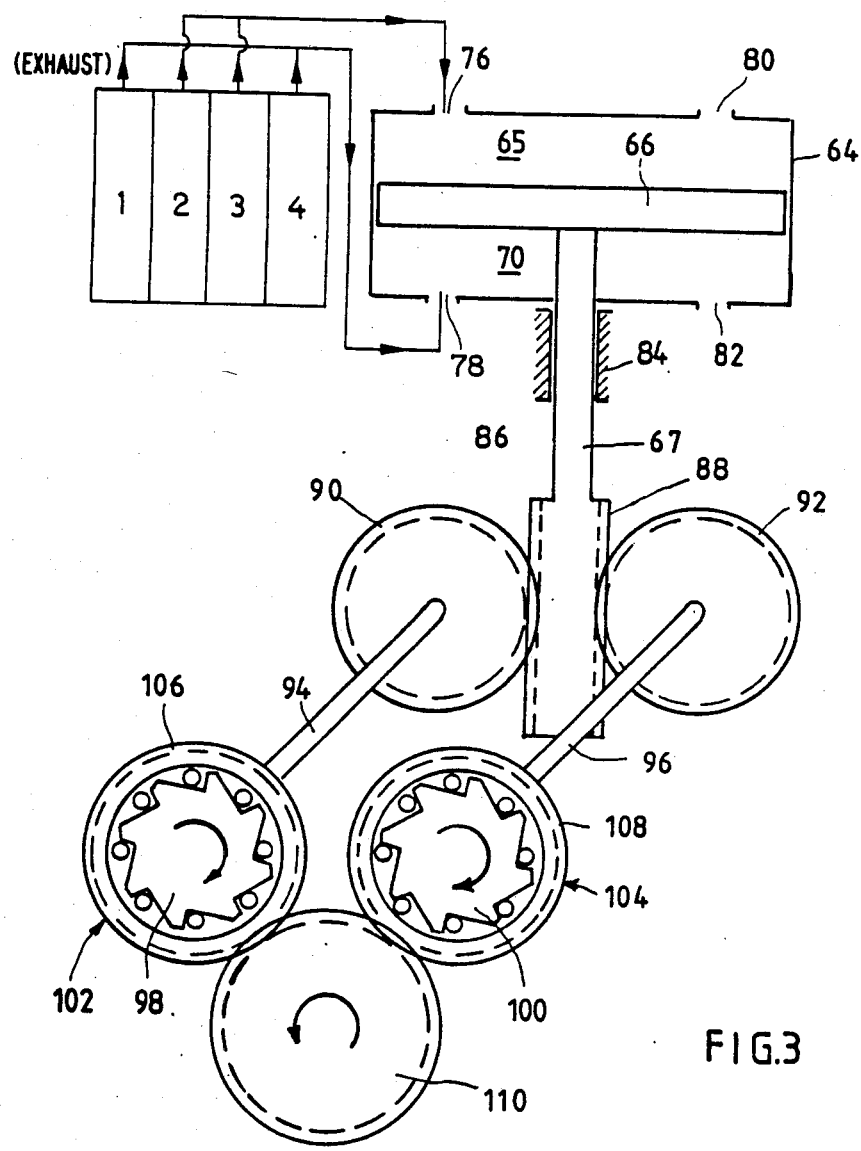
FIG. 3 is a diagrammatic view of a working example of the invention similar to that of FIG. 2 with a double-acting piston and a reversing means.

In a way similar to that shown in FIG. 3 it is also possible to have a reversing means in order to transmit the energy of the exhaust gas of both directions of the oscillating motion of the charger shaft 16 to the output drive side of the engine.

Figure 2:
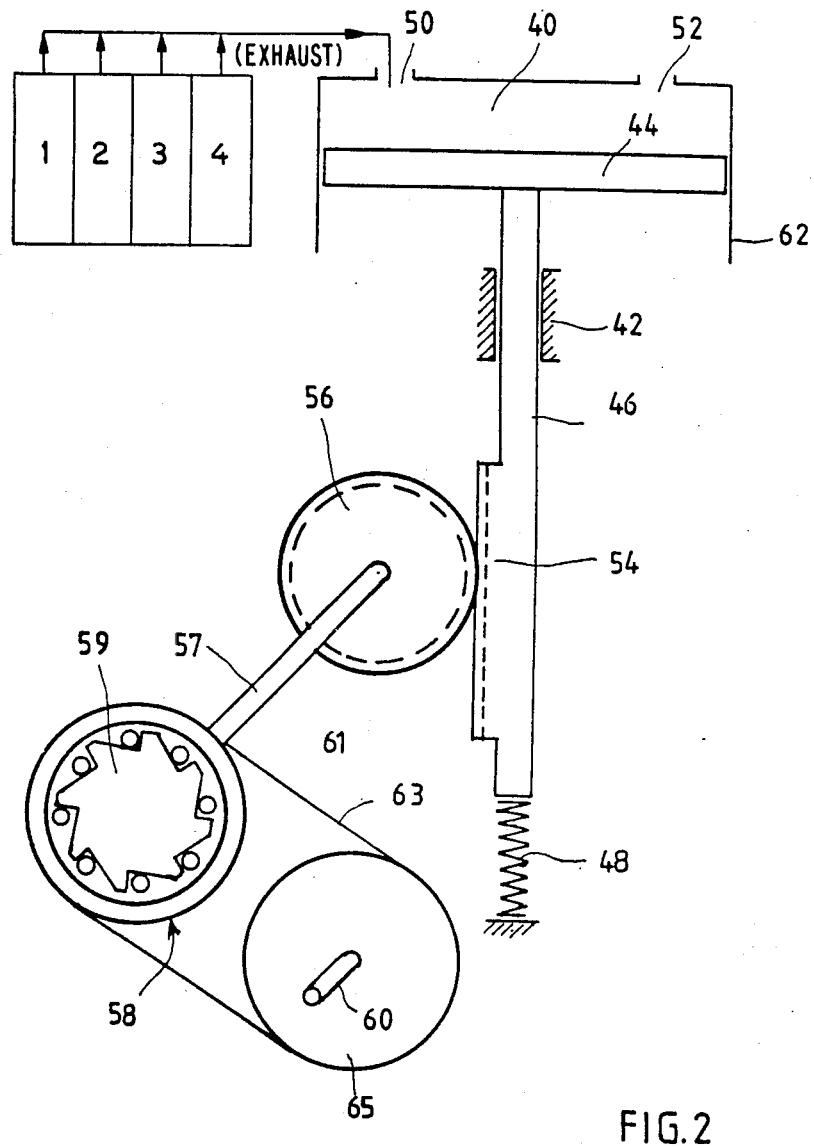
FIG. 2 is a diagrammatic view of an apparatus incorporating the present invention with a single-acting. linearly moving piston.

FIG. 2 shows an expansion device with disk-like pistons, viz., with a piston stroke that is low in comparison with the piston diameter and with a small size of the piston in the stroke direction. This is made possible by having a piston rod 46 that is guided at 42 outside the expansion chamber 40, connected with the piston 44. The piston rod 46 is supported in the expansion direction by a spring 48 functioning as a returning means. The expansion chamber 40 has an exhaust gas inlet 50 and and exhaust gas outlet 52. The piston rod 46 is fitted with a rack section 54, that meshes with a gearwheel 56, that is joined by way of a shaft 57 with the inner race ring 59 of a freewheel 58, whose outer race ring 61 is joined by way of a belt drive 63 with an output wheel 65, that is mounted in an output drive shaft 60. As a directional clutch the freewheel 58 transmits the expansion stroke to the output drive shaft 60 but not on the other hand the return motion of the piston 44 as caused by the spring 48.

FIG. 3 shows a further possible form of the disk piston design as in FIG. 2, in which on the same lines as in FIG. 1, the piston 44 may be acted upon by exhaust gas in both directions of its stroke. While in the case of the design of FIG. 2 the expansion chamber 40 is delimited by a cup-like housing 62 opening in the direction of expansion and the piston 44 covering over this opening, in the case of the design of FIG. 3 there is housing 64 that is shut off on all sides and which is divided by the piston 66 into two expansion chambers 68 and 70 that are to be supplied with gas acting in opposite directions. While in FIG. 2 the housing is fitted with two fluid connections, namely an exhaust gas inlet and an exhaust gas outlet, the housing 64 in FIG. 3 has four fluid connections, that are distributed in pairs between the two expansion chambers 68 and 70, namely exhaust gas inlets 76 and 78, respectively, and exhaust gas outlets 80 and 82, respectively. The piston rod 67 is guided at 84 outside the housing 64 and fitted on two opposite sides with rack sections 86 and 88, respectively. A pinion 90 meshes with the rack section 86 and a pinion 92 meshes with the rack section 88. The pinions 90 and 92 are each keyed on respective parallel shafts 94 and 96, that for their part carry the inner race ring 98 and 100, respectively, with which they are joined for the transmission of torque therebetween, of the freewheels 102 and 104, respectively. The outer rings 106 and 108, respectively, are in the form of toothed rings and mesh with a common output drive wheel 110. The freewheels 102 and 104 are designed for the transmission of force in the same direction, as for example in FIG. 3 in the clockwise direction.

When the expansion chamber 68 receives exhaust gas so that the piston 66 is moved downwards, the left hand pinion 90 is driven in a clockwise direction, whereas on the other hand the pinion 92 is driven counter-clockwise. Consequently the motion of the pinion 90 is transmitted via the freewheel 102 to the output drive wheel 110, whereas the oppositely directed motion of the pinion 92 is only transmitted as far as the inner race ring 100 of the freewheel 104, whose outer race ring 108 runs with slack with the output drive wheel 110 and turns clockwise, that is to say in the opposite direction to the motion transmitted to the pinion 92. If now the expansion chamber 70 receives gas, the pinion 92 will be turned clockwise during the upward motion of the piston rod 67, whereas the pinion 90 turns counter-clockwise. Consequently the motion of the pinion 92 is transmitted by way of the freewheel 105 to the output drive wheel 110, that is therefore further driven in the clockwise direction, whereas the outer race ring of the free wheel 102 is entrained with slack.

I claim:

1. An apparatus for expanding pressurized, pulsating exhaust gases of an internal combustion engine having an output drive, comprising:
   at least two expansion chambers for enabling expansion of said pressurized pulsating exhaust gases;
   a piston surface in each of said expansion chambers oscillating in response to said pressurized pulsating exhaust gases;
   an output drive connected to said oscillating piston surfaces; and
   a directional clutch means associated with said piston output drive and said output drive of said internal combustion engine such that said piston output drive transmits force to said output drive of said internal combustion engine.

2. The apparatus according to claim 1 wherein said directional clutch means enables only positive force to be transmitted to said output drive of said internal combustion engine in response to said piston oscillation.

3. The apparatus according to claim 1 wherein said directional clutch means includes a pair of directional clutches and a reversing means such that only positive force is transmitted to said output drive of said internal combustion engine in response to said piston oscillation.

* * * * *